US012750380B2

(12) United States Patent
Zhou et al.

(10) Patent No.: US 12,750,380 B2
(45) **Date of Patent: *Sep. 29, 2026**

(54) FEATURE MODIFICATION TO CHANGE MACHINE LEARNING PREDICTIONS

(71) Applicant: Citibank, N.A., New York, NY (US)

(72) Inventors: Rongrong Zhou, Washington, DC (US); Ganesh Babu Gopal, Coppell, TX (US)

(73) Assignee: Citibank, N.A., New York, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 19/169,322

(22) Filed: Apr. 3, 2025

(65) Prior Publication Data

US 2026/0106879 A1 Apr. 16, 2026

Related U.S. Application Data

(63) Continuation-in-part of application No. 19/014,159, filed on Jan. 8, 2025, which is a continuation of (Continued)

(51) Int. Cl.
*H04L 9/40* (2022.01)

(52) U.S. Cl.
CPC ................................ *H04L 63/1416* (2013.01)

(58) Field of Classification Search
CPC ............ H04L 63/1416; G06Q 20/4016; G06Q 20/405; G06N 5/025; G06N 20/00

(Continued)

(56) References Cited

U.S. PATENT DOCUMENTS 8,082,349 B1 * 12/2011 Bhargava ............ H04L 63/1416 709/227
8,595,834 B2 * 11/2013 Xie ....................... G06F 21/566 726/22

(Continued)

FOREIGN PATENT DOCUMENTS

CN 114445088 A 5/2022
CN 114638685 A 6/2022
WO 2022081930 A1 4/2022

OTHER PUBLICATIONS

International Search Report and Written Opinion issued Feb. 4, 2026, in International PCT Application No. PCT/US2025/050621 (16 pages).

(Continued)

*Primary Examiner* — Badri Narayanan Champakesan
(74) *Attorney, Agent, or Firm* — Ashurst Perkins Coie US LLP

(57) ABSTRACT

Systems and methods for analyzing operations to determine factors contributing to a malicious classification and providing recommendations to prevent future misclassifications are disclosed herein. A feature modification system receives operation data associated with monitored operations, where each operation is characterized by a set of feature values. A machine learning-based detection model processes the operation data to generate a prediction indicating whether each operation is malicious. Based on a prediction indicating that an operation has been classified as malicious, the system determines the impact of each feature on the prediction as well as the variability of each feature to identify impactful and modifiable features. The system generates an input dataset including entries with modified features and processes the dataset to obtain a new set of predictions. If a modified entry results in a non-malicious classification, the (Continued)

system generates a recommendation indicating the modifications required to avoid future misclassifications.

17 Claims, 7 Drawing Sheets

Related U.S. Application Data application No. 18/914,035, filed on Oct. 11, 2024, now Pat. No. 12,225,026.

(58) Field of Classification Search
USPC ..... 726/23
See application file for complete search history.

(56) References Cited

U.S. PATENT DOCUMENTS

| | | | | |
|---|---|---|---|---|
| 10,521,837 | B1 | 12/2019 | Mossoba et al. | |
| 11,153,332 | B2 * | 10/2021 | Dichiu | H04L 63/1416 |
| 11,777,957 | B2 * | 10/2023 | Chen | H04L 63/1441 726/23 |
| 11,824,872 | B1 * | 11/2023 | Meyer | G06F 21/6245 |
| 12,099,571 | B2 * | 9/2024 | Yan | G05B 13/027 |
| 12,323,435 | B2 * | 6/2025 | Siddiqui | H04L 63/1416 |
| 2004/0054619 | A1 * | 3/2004 | Watson | G06Q 10/10 705/38 |
| 2017/0076089 | A1 * | 3/2017 | Turgeman | G06F 3/04812 |
| 2018/0191867 | A1 * | 7/2018 | Siebel | G06F 8/10 |
| 2018/0288063 | A1 * | 10/2018 | Koottayi | G06F 21/50 |
| 2018/0349583 | A1 * | 12/2018 | Turgeman | H04L 63/0861 |
| 2020/0285737 | A1 * | 9/2020 | Kraus | G06F 21/552 |
| 2020/0320534 | A1 | 10/2020 | Yerradoddi et al. | |
| 2020/0374297 | A1 * | 11/2020 | Bilas | H04L 63/1433 |
| 2021/0073819 | A1 | 3/2021 | Hernandez et al. | |
| 2021/0357940 | A1 | 11/2021 | Benkreira et al. | |
| 2022/0046047 | A1 * | 2/2022 | Lewis | G06F 18/214 |
| 2022/0058660 | A1 * | 2/2022 | Ivanov | G06F 21/554 |
| 2022/0076270 | A1 | 3/2022 | Vokes et al. | |
| 2022/0166784 | A1 * | 5/2022 | Patton | H04L 51/212 |
| 2023/0164158 | A1 * | 5/2023 | Fellows | H04L 63/1441 726/23 |
| 2023/0269264 | A1 * | 8/2023 | Yao | G06F 11/3438 726/23 |
| 2023/0275905 | A1 * | 8/2023 | Yarabolu | H04L 63/1425 726/4 |
| 2023/0319088 | A1 * | 10/2023 | Chesla | H04L 63/1416 726/23 |
| 2024/0104574 | A1 | 3/2024 | Kala et al. | |
| 2024/0323208 | A1 * | 9/2024 | Divakaran | H04L 63/1425 |
| 2024/0406192 | A1 * | 12/2024 | Arnon | H04L 63/1416 |

OTHER PUBLICATIONS

Office Action Non-Final mailed Jun. 8, 2026, in U.S. Appl. No. 19/014,159 (53 pages).
International Search Report and Written Opinion issued in International Application No. PCT/US2024/049095 on Jan. 15, 2025 (11 pages).

* cited by examiner

300

| ID (303) | Value (306) | Location (309) | Time of Day (312) | Outcome (315) |
|---|---|---|---|---|
| 001 | 50 | USA | 3:00 PM | Approved |
| 002 | 5000 | Canada | 10:35 AM | Declined |
| 003 | 2000 | USA | 2:00 AM | Declined |
| 004 | 400 | Mexico | 6:27 PM | Approved |

FIG. 3

400

| ID (403) | Subset of Features (406) | Modified Subset of Features (409) | Outcome (Original → Modified) (412) |
|---|---|---|---|
| 002 | Value: 5000<br>Location: Canada | Value: 3000<br>Location: USA | Declined → Approved |
| 003 | Value: 2000<br>Time: 2:00 AM | Value: 2000<br>Time: 8AM | Declined → Approved |
| 005 | Device: New,<br>Unrecognized | Device: Verified | Declined → Approved |

FIG. 4

FEATURE MODIFICATION TO CHANGE MACHINE LEARNING PREDICTIONS

CROSS-REFERENCE TO RELATED APPLICATIONS

This application is a continuation-in-part of U.S. patent application Ser. No. 19/014,159, filed Jan. 8, 2025, entitled "DETECTING MALICIOUS ACTIVITY USING USER-SPECIFIC PARAMETERS," which is a continuation of U.S. patent application Ser. No. 18/914,035, filed Oct. 11, 2024, entitled "DETECTING MALICIOUS ACTIVITY USING USER-SPECIFIC PARAMETERS," which are hereby incorporated by reference in their entirety.

SUMMARY

Current computing systems monitor and evaluate operations (e.g., electronic activities) to detect potential malicious operations by users. For example, conventional systems may apply static rules to operations in order to detect malicious activity. Oftentimes, such approaches are either overinclusive, flagging or blocking legitimate operations, or under-inclusive, failing to detect malicious operations. Moreover, these approaches do not adapt to the unique operational patterns of individual users. Additionally, when users'operations are incorrectly flagged as malicious, users are left without clear guidance on how to modify their behavior to avoid future blocks. This lack of transparency leads to repeat issues and, as a result, system slowdowns.

To address these challenges, methods and systems are disclosed herein for recommending feature modifications to change malicious activity predictions generated by machine learning models. In particular, the disclosed system herein may address these challenges using a feature modification system. The feature modification system may use a feature impact model to identify the features (e.g., factors) that most significantly impact a prediction by a detection model that an operation is malicious. By analyzing these features and their variability, the feature modification system can generate recommendations for modifying the features to avoid future blocks.

In particular, the feature modification system may receive an indication of a first prediction generated by a detection model. The first prediction may indicate that an operation is malicious (e.g., unauthorized, poses a security threat). The first prediction may refer to the initial assessment made by the detection model regarding the nature (e.g., malicious or non-malicious) of an operation. When the first prediction indicates a malicious operation, the operation may be blocked. As an illustrative example, the feature modification system may be monitoring network traffic for a secure server. The detection model, as part of the feature modification system, may detect an unauthorized attempt (e.g., login using credentials that do not match any authorized users) to access a secure server. The detection model analyzes various features of the operation (e.g., attempt to access the secure server), such as the IP address of the attempt, the time of the attempt, and the type of request being made. Based on the features, the detection model may generate a first prediction that the attempt to access the secure server is malicious. The unauthorized attempt may be blocked based on the first prediction.

The feature modification system may input operation data for the operation into a feature impact model to obtain feature impact parameters. These parameters indicate the relative impact of each feature of the operation data on the first prediction. The feature impact model may be trained to output the relative impacts of features on predictions generated by models. The operation data includes values associated with the features. As an illustrative example, the operation data may include the IP address, time of access, and type of request made during the unauthorized access attempt on the secure server. The feature impact model may process the operation data to determine the relative impact of each feature on the first prediction. The feature impact model may find that the time of access and type of request were the most significant features in predicting that the attempt to access the server was malicious. Identifying the most impactful features may enable the feature modification system to generate effective recommendations for modifying these features to avoid future blocks.

The feature modification system may select a subset of the features based on feature impact parameters and measures of variability. Each measure of variability may indicate the extent to which a corresponding feature can be modified. Continuing with the previous example, the feature modification system may determine that the time of access and type of request are the most impactful features in predicting that an attempt to access the secure server is malicious. The measure of variability may indicate how feasible it is to adjust each of these features. The feature modification system may determine that the time of access can be easily modified by the user, such as by attempting access during business hours instead of non-business hours (e.g., late at night) when network traffic is not expected. Similarly, the type of request can feasibly be adjusted, such as by changing from a high-risk request (e.g., accessing sensitive data) to a lower-risk request (e.g., accessing general information). By understanding the variability of each feature, the feature modification system can generate feasible recommendations for modifying various features.

The feature modification system may generate an input dataset of entries. Each entry may include a different combination of values for the features based on proposed modifications to the subset of features. For example, continuing with the previous example, the input dataset may include various combinations of access times and request types to determine a combination of values that would not be flagged as malicious. The feature modification system may generate entries with different access times, such as during business hours, early morning, or late at night, and different request types, such as accessing general information, retrieving sensitive data, or performing administrative tasks. By evaluating these combinations, the feature modification system may identify which specific combinations of features are less likely to be flagged as malicious. For example, the feature modification system may input the generated input dataset into the detection model to obtain predictions corresponding to the entries. Each prediction may indicate whether the operation, based on the modified feature values, is likely to be malicious. Among these predictions, a prediction for a particular entry may indicate that the operation is not malicious. For example, the prediction for the particular entry may be a second prediction, which indicates non-malicious activity. Continuing with the previous example, the feature modification system may find that accessing the server during business hours with a specific type of request (e.g., requesting general information) is not flagged as malicious. By analyzing the multiple predictions, the feature modification system may identify the combinations of feature values that result in non-malicious predictions.

The feature modification system may generate a recommendation indicating one or more modifications to the features based on the values of the entry corresponding to the second prediction. This recommendation helps users understand how to modify their behavior to avoid future blocks. For example, continuing with the previous example, the feature modification system may recommend that the user access the server during business hours and use a specific type of request (e.g., accessing general information) to avoid being flagged as malicious and being blocked. By providing these recommendations, the feature modification system may guide users with recommendations on how to adjust their actions to ensure non-malicious operations are not blocked.

In some embodiments, the feature modification system may then input the modifications into a generative artificial intelligence model (e.g., a large language model (LLM)) to generate the recommendation for the user. In particular, the feature modification system may input the modifications into an LLM with a prompt to cause the LLM to generate a natural language output indicating the modifications and reasoning for making the modifications to change the malicious activity prediction. Once the LLM returns the output in response to the prompt, the feature modification system may generate for display (e.g., for a user) the natural language output of the recommendation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an example table representing operation data, in accordance with one or more embodiments of this disclosure.

FIG. 4 illustrates an example table representing recommendations of modifications to features of the operation data, in accordance with one or more embodiments of this disclosure.

DETAILED DESCRIPTION

Figure 1:
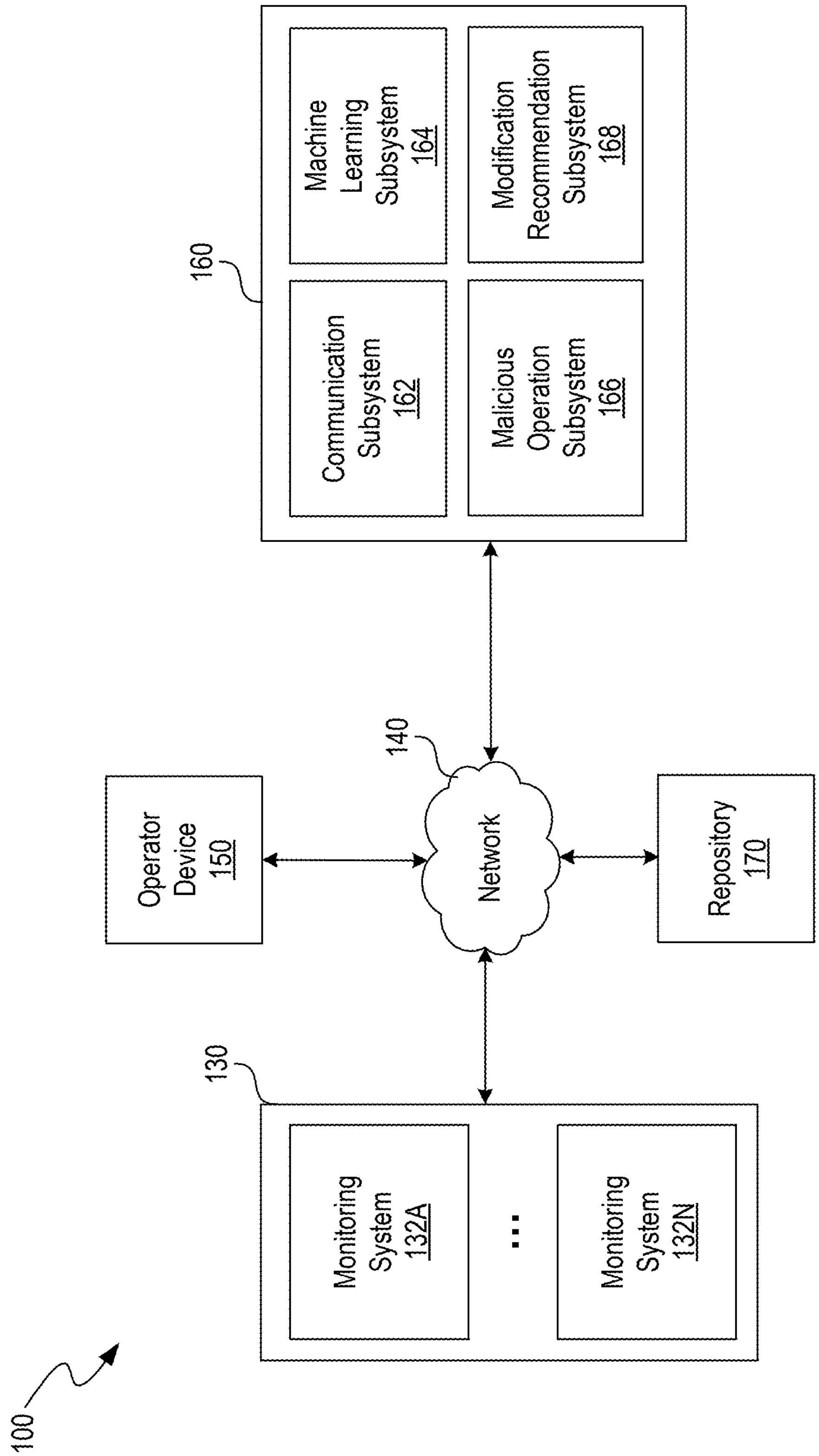
FIG. 1 shows an illustrative system for recommending feature modifications to change malicious activity predictions generated by machine learning models, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

The disclosed technology provides a system and method for recommending feature modifications to change predictions generated by machine learning models (e.g., detection model, feature impact model). The feature modification system may be configured to receive operation data associated with multiple monitored activities and predict potential security threats. The operation data may include metrics such as IP addresses, access times, geographic locations, types of requests, and user behavior patterns. The operation data is input into a machine learning detection model trained to predict whether certain operations are potentially malicious. If the feature modification system receives an indication of the first prediction being a malicious operation, then the operation is blocked.

Based on the first prediction indicating malicious operations (e.g., potential security threats), the feature modification system may retrieve the impact parameters of various features related to the operations. These impact parameters indicate the impact of each feature on the prediction outcome. For example, features such as access types and access times might have a higher impact than other features on whether an operation is flagged as malicious. The feature impact model can output the relative impacts of these features on the detection model's predictions.

The feature modification system may further evaluate the measures of variability of the features, determining which features can be feasibly modified to alter the prediction outcomes. For example, each measure of variability indicates the extent to which a corresponding feature can be adjusted. The feature modification system selects a subset of features (e.g., specific access times or types of requests) capable of being altered to change the prediction.

To determine effective modifications of the subset of features, the feature modification system may generate an input dataset with multiple entries, each entry featuring different combinations of proposed modifications to the subset of features. For example, the feature modification system may modify access times (e.g., from late-night access to business hours) and types of requests (e.g., from accessing sensitive data to accessing general information). The input dataset is then fed into the detection model to generate predictions corresponding to these entries. The feature modification system may aim to identify a specific combination of feature modifications that results in a prediction indicating non-malicious activity for the operation. Through this process, the feature modification system may assess how different combinations of modified feature values impact the likelihood that an operation is flagged as malicious.

Upon identifying an entry (e.g., a combination of feature values from the input dataset) that yields a prediction indicating non-malicious activity for the operation, the feature modification system may generate a recommendation for modifying one or more features based on the entry. This recommendation advises users on how to modify their behavior to avoid future blocks. For example, the feature modification system may suggest accessing the server during business hours or altering request types to avoid being flagged as malicious. These recommendations help users understand how to adjust their operations to avoid security blocks and ensure legitimate activities are not mistakenly flagged. By continuously monitoring operations, analyzing features, and suggesting feature modifications, the disclosed feature modification system may improve the transparency and precision of malicious activity detection systems.

FIG. 1 shows an illustrative system 100 for recommending feature modifications to change malicious activity predictions generated by machine learning models, in accordance with one or more embodiments of this disclosure. For example, the system 100 may be used to predict and mitigate potentially malicious operations, such as anomalous login attempts to secure accounts. In some embodiments, the system 100 may utilize operation data (e.g., user behavior metrics, operation details, timing metrics, access logs) to predict potential malicious operations using a trained machine learning model. The machine learning model may be able to identify specific user patterns and operations that are likely to be malicious (e.g., unauthorized activities) or legitimate (e.g., authorized activities). In cases where the output of the machine learning model shows uncertainty (e.g., incomplete predictions) based on the first set of operation data, the system 100 may obtain more operation data (e.g., operation history, behavioral analytics, or biometrics) with which to augment the data (e.g., refine the machine learning prediction) and use the augmented data to ascertain whether malicious operations exist.

For example, the system 100 may include a feature modification system 160 able to monitor, detect, and predict when an operation may be malicious. The feature modification system 160 may include software, hardware, or a combination of the two. For example, the feature modification system 160 may be a physical server or a virtual server that is running on a physical computer system. In some embodiments, the feature modification system 160 may be configured on a user device (e.g., a laptop computer, a smartphone, a desktop computer, an electronic tablet, or another suitable user device) and configured to execute instructions for monitoring and predicting malicious operations. In particular, the feature modification system 160 may include several subsystems each configured to perform one or more steps of the methods described herein, such as a communication subsystem 162, a machine learning subsystem 164, a malicious operation subsystem 166, and a modification recommendation subsystem 168.

As described herein, the feature modification system 160 may obtain data to determine whether an operation is predicted to be malicious. The feature modification system 160 may receive the data from monitoring systems such as from a set of monitoring systems 130 (e.g., including monitoring system 132A, monitoring system 132N). As described herein, a monitoring system can be any system (e.g., computer, device, node, etc.) that is enabled to execute one or more tools for monitoring operations or enabled to execute tasks for which data may be passively collected. The feature modification system 160 may be configured to receive the data via a communication network 140 at the communication subsystem 162. The communication network 140 may be a local area network (LAN), a wide area network (WAN; e.g., the internet), or a combination of the two. The communication subsystem 162 may include software components, hardware components, or a combination of both. For example, the communication subsystem 162 may include a network card (e.g., a wireless network card or a wired network card) that is associated with software to drive the card. The communication subsystem 162 may pass at least a portion of the data, or a pointer to the data in memory, to other subsystems, such as the machine learning subsystem 164, the malicious operation subsystem 166, and the modification recommendation subsystem 168.

According to some embodiments, the feature modification system 160 may be able to obtain such data by generating one or more commands that configure the tool-based monitoring systems to execute monitoring operations to obtain operational metrics. In some examples, the command(s) may specify a specific timeframe for obtaining the data (e.g., explicitly by identifying the timeframe via a start and an end time, or implicitly by requesting data from a current block of time). Additionally, the system 100 may include a repository 170, which may store historical operation data, operational metrics, feature impact parameters, machine learning model parameters, and system commands. In some embodiments, the repository 170 may store preconfigured commands related to detecting malicious operations and modifying features, which may be used by the feature modification system 160 to manage operation performance dynamically. The repository 170 may also include metadata or tags associated with stored data, such as operation identifiers, modification policies, or usage trend patterns. The feature modification system 160 may retrieve data from the repository 170 to refine its predictions, optimize operation outcomes, and improve the accuracy of malicious operation detection. Additionally, the repository 170 may store augmented datasets used to update the machine learning model based on newly collected operation data, ensuring adaptive and evolving predictions.

The system 100 may further include an operator device 150, which may receive alerts generated by the feature modification system 160 when a potential malicious operation is detected. The operator device 150 may be a desktop computer, mobile device, or other suitable user interface through which an operator may review system notifications and monitor operation outcomes, such as flagged or blocked operations. The feature modification system 160 may transmit natural language explanations to the operator device 150 to provide insight into malicious operations and system responses.

Figure 2:
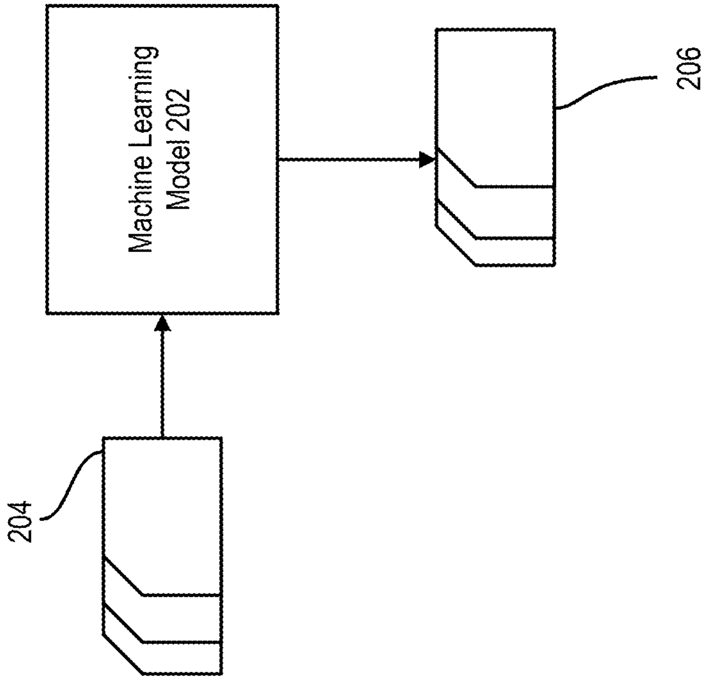
FIG. 2 illustrates an exemplary machine learning model, in accordance with one or more embodiments of this disclosure.

FIG. 2 illustrates an exemplary machine learning model 202, in accordance with one or more embodiments of this disclosure. The machine learning model 202 may be the detection model, a feature impact model, or another model. According to some examples, the machine learning model may be any model, such as a model for classification. In some embodiments, the machine learning model 202 may be trained to intake input 204, including input data received. As a result of inputting the input 204 into the machine learning model 202, the machine learning model 202 may then output an output 206. As described herein, the input data can include data such as the operational metric dataset, the augmented operational metric dataset, or a vectorized version of either dataset. In particular, the machine learning model 202 may receive, for a plurality of operations, operation data. The operation data may indicate each operation of the plurality of operations is associated with a corresponding set of feature values.

For example, the output 206 may include an indication of an operational condition, such as a label for the type of usage condition (e.g., "malicious activity detected," "anomalous behavior," etc.) and a degree of the operational condition, which may be a numerical rating indicating the severity, or may be a classification (e.g., "severe," "moderate," or "low"). Furthermore, as described, the machine learning model 202 may be configured to output a confidence interval or other metric for certainty regarding the classification of the operation or other outputs. The machine learning model 202 may have been trained on a training dataset containing a plurality of operation datasets and labels such as a degree and indication for security conditions that were identified by operators. Moreover, the machine learning model 202 may have been trained on operation data including timing data and access metrics for the plurality of operations. In some embodiments, the training may involve inputting the operation data into the machine learning model 202 with a first prompt to identify a subset of the features that affect the classification of an operation as malicious or non-malicious. The operation data may include one or more of access times, request types, geographic locations, or authentication methods. In another embodiment, the feature modification system 160 may input the identified subset of operation data into the machine learning model 202 with a second prompt to instruct the machine learning model 202 to generate a natural language explanation describing the reason for the subset of features that are behind the malicious prediction. The feature modification system 160 may then generate the natural language output for display to allow operators to view human-readable explanations of why an operation was flagged as malicious and the contributing factors that were most influential. For example, the machine learning model 202 is described in relation to FIG. 2 herein.

The output parameters may be fed back to the machine learning model 202 as input to train the machine learning model 202 (e.g., alone or in conjunction with user indications of the accuracy of outputs, labels associated with the inputs, or other reference feedback information). The machine learning model 202 may update its configurations (e.g., weights, biases, or other parameters) based on the assessment of its prediction and reference feedback information (e.g., user indication of accuracy, reference labels, or other information). Connection weights may be adjusted, for example, if the machine learning model 202 is a neural network to reconcile differences between the neural network's prediction and the reference feedback regarding operational conditions (e.g., predicted malicious activity, anomalous behavior, or unauthorized access attempts). In some embodiments, the machine learning model 202 may include an explainability model. The explainability model may be trained to predict, for each operational input into the explainability model, a subset of fields from the operation data that best predict the corresponding prediction outcome. For example, the explainability model may determine that, for a specific operation, access time and authentication method are the primary contributing factors to a malicious prediction, while request type is less relevant. The feature modification system 160 may use this information to refine its predictions and recommend modifications that improve classification accuracy while minimizing unnecessary operational restrictions.

Explainability models are used in machine learning systems to provide transparency into the factors that influence a model's predictions. In traditional machine learning models, decisions are often based on complex, high-dimensional relationships within data, making it difficult to interpret why a particular prediction was made. Explainability models address this issue by identifying key input parameters that contribute to the output, allowing operators to understand, validate, and refine model behavior. Various techniques, such as feature attribution methods (e.g., Shapley values, Integrated Gradients) or surrogate models (e.g., Local Interpretable Model-agnostic Explanations (LIME)), may be employed to generate interpretable insights about how different features impact predictions.

In regard to operation monitoring, the explainability model may be used to analyze factors contributing to predicted malicious classifications. The feature modification system 160 may input the operation data into the explainability model to determine which parameters—such as access time, authentication method, request type, or geographic location—most significantly influence the machine learning model's output. The explainability model may generate an attribution score or ranked list of key features, allowing the feature modification system 160 to assess which resource constraints are driving malicious predictions. This information may further be used to refine future predictions or improve the effectiveness of feature modification recommendations.

In some embodiments, the feature modification system 160 may further input the output of the explainability model into an LLM with a second prompt to generate a natural language output describing the reasons for the predicted malicious classification. The natural language output may be displayed to an operator, providing an intuitive summary of which factors contributed to the machine learning model's prediction and any recommended adjustments. By integrating explainability into operation predictions, the feature modification system 160 may improve transparency, improve trust in automated decision-making, and allow more effective resource management.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions.

In some embodiments, the machine learning model 202 may include an artificial neural network. In such embodiments, the machine learning model 202 may include an input layer and one or more hidden layers. Each neural unit of the machine learning model 202 may be connected to one or more other neural units of the machine learning model 202. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 202 may be self-learning or trained rather than explicitly programmed and may perform significantly better in certain areas of problem-solving as compared to computer programs that do not use machine learning. During training, an output layer of the machine learning model 202 may correspond to a classification of the machine learning model 202, and an input known to correspond to that classification may be input into an input layer of the machine learning model 202 during training. During testing, an input without a known classification may be input into the input layer, and a determined classification may be output.

The machine learning model 202 may include embedding layers in which each feature of a vector is converted into a dense vector representation. These dense vector representations for each feature may be pooled at one or more subsequent layers to convert the set of embedding vectors into a single vector. The machine learning model 202 may be structured as a factorization machine model. The machine learning model 202 may be a non-linear model or supervised learning model that can perform classification or regression. For example, the machine learning model 202 may be a general-purpose supervised learning algorithm that the feature modification system 160 uses for both classification and regression tasks. Alternatively, the machine learning model 202 may include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, or other such possible connections between neurons or layers, which are not discussed in detail here.

A deep neural network (DNN) is a type of neural network having multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" may be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), or may encompass another domain or domains, be they larger or smaller than a single language or subject domain. For example, a relatively large, multilingual, and non-subject-specific corpus can be created by extracting text from online webpages or publicly available social media posts. Training data can be annotated with ground truth labels (e.g., each data entry in the training dataset can be paired with a label) or may be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during machine learning model training. For example, the training set may be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set may then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) may begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) may begin. The output generated from the testing set may be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training may be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed and the machine learning model may be deployed to generate output in real-world applications (also referred to as "inference").

In some examples, a trained machine learning model may be fine-tuned, meaning that the values of the learned parameters may be adjusted slightly in order for the machine learning model to better model a specific task. Fine-tuning of a machine learning model typically involves further training the machine learning model on a number of data samples (which may be smaller in number/cardinality than those used to train the model initially) that closely target the specific task. For example, and machine learning model for generating natural language, e.g., for alerts to operators, or commands that have been trained generically on publicly available text corpora may be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It may be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any machine learning-based language model, including language models based on other neural network architectures such as RNN-based language models.

FIG. 3 illustrates an example table 300 representing operation data in accordance with one or more embodiments of this disclosure. The feature modification system 160 may receive an operation (e.g., transaction) and process the operation data, which includes values associated with features (e.g., value, location, time of day of a transaction). This may enable the feature modification system 160 to evaluate the operation's characteristics (e.g., whether the operation is malicious or non-malicious) to determine an outcome (e.g., approved or declined). In particular, the feature modification system 160 may receive an indication of a first prediction generated by a detection model. The first prediction may indicate that an operation is malicious and results in the operation being blocked. The operation data may indicate values associated with the features, as shown in FIG. 3.

As shown in FIG. 3, table 300 may contain six fields (e.g., field 303, field 306, field 309, field 312, and field 315) representing different attributes (e.g., ID, value, location, time of day, outcome) of the operations (e.g., T001, T002, T003, and T004) processed and analyzed by the feature modification system 160. The feature modification system 160 may process these fields to determine whether an operation (e.g., transaction) should be flagged as malicious and subsequently declined.

Field 303 may include unique identifiers assigned to each operation, such as 001 for the first operation or 004 for the fourth operation. The field 303 unique identifiers may help the feature modification system 160 track and reference specific operations. When an operation is flagged as malicious, the feature modification system 160 may associate the operation's unique identifier with relevant operation data (e.g., logs and historical records) to ensure consistent monitoring of the features (e.g., monitoring value, location, and time of day of operation) and reporting (e.g., declining the operation and reporting which feature or features caused the decline).

Field 306 may include the value of the operation. The feature modification system 160 may use a detection model to assess the value (e.g., 50, 5000, 2000, 400) to determine whether the value deviates significantly from the user's historical behavior. For example, operations with unusually high values, such as 5000 or 2000, may be considered high-risk operations and, therefore, subject to stricter malicious detection measures.

Field 309 may include the location where the operation was initiated. The feature modification system 160 may evaluate whether the location aligns with typical geographic patterns of the user. If an operation originates from an unfamiliar or high-risk location such as a country where the user has no previous activity, then the location may increase the likelihood that the operation is flagged as malicious. For example, if an operation typically occurs in the USA, but the current operation originates in Canada, the feature modification system 160 may identify this geographic discrepancy as a risk factor. However, if the operation occurs in a country the user has previously visited, such as Mexico, and the user has historical operation data logged from that location, the feature modification system 160 will recognize the user's patterns and not flag the operation as malicious.

Field 312 may include the time of day when the operation occurred. Certain operations occurring during non-business hours or at times inconsistent with the user's historical patterns may contribute to the likelihood of a malicious classification that may result in a reason to decline the operation. For example, an operation occurring at 2:00 AM, when the user does not typically perform operations, may be considered an anomalous event, leading to a malicious prediction that declines the operation.

Field 315 may indicate the outcome of the operation, which may either be "Approved" or "Declined." If the detection model predicts that an operation is malicious, the feature modification system may automatically block the operation and assign a "Declined" status. Conversely, if the operation does not meet the risk threshold, the operation is "Approved."

The feature modification system 160 may determine feature impact parameters, which specify the contribution of each feature to the operation being flagged as malicious. The feature impact parameters may allow the feature modification system 160 to provide the user an explanation for the reasons for a decline and assist in further analysis by the feature impact model. In particular, the feature modification system 160 may input, into a feature impact model (e.g., as discussed in greater detail below), operation data to obtain feature impact parameters indicating a relative impact of each feature on the first prediction as generated by the detection model. The feature modification system 160 may use the feature impact parameters to select certain features that contributed the most to the malicious prediction. As an example, the feature modification system 160 may compare the feature impact parameters to a threshold, select a certain number of features having the highest feature impact parameters, or use other methods for selecting features based on the feature impact parameters. For example, for operation 002, the features having the highest feature impact parameters may include "Value, Location," indicating that the combination of an unusually high operation value and an unfamiliar geographic location are features that played a significant role in the operation being declined, as the user's historical patterns for similar operations do not align. Similarly, for operation 003, the features having the highest feature impact parameters may include "Value, Time," highlighting that the detection model identified both the operation value and its occurrence at 2:00 AM as high-risk factors (e.g., Value, Time).

The feature modification system 160 may utilize the feature impact parameters to refine and improve the malicious operation subsystem 166. The presence of specific, high-impact features in declined operations may enable the feature modification system 160 to input operation data into a feature impact model to determine the relative impact of each feature. The feature impact model, trained to analyze and quantify the influence of different attributes on malicious predictions, may generate feature impact parameters that indicate the extent to which each feature contributed to the prediction being malicious. In particular, the feature impact model may be trained to output relative impacts of features on predictions generated by models, such as the feature impact model. The operation data may indicate values associated with the features. Additionally, the insights obtained from the feature impact parameters may inform the modification recommendation subsystem 168, allowing the feature modification system 160 to suggest modifications (e.g., alternative behaviors) to the features having the highest feature impact parameters in order to prevent future declines. The concept of recommended modifications for users by the feature modification system 160 is further discussed in relation to subsequent figures.

FIG. 4 illustrates an example table 400 representing recommendations of modifications to features of the operation data, in accordance with one or more embodiments of this disclosure. For example, the example table 400 may include recommendations for a user to modify features from malicious operations (e.g., operation outcome is "declined") to non-malicious operations for approval. Table 400 builds upon the features of table 300, providing recommended modifications that could lead to an operation from 002 and 003 being approved instead of declined. These recommendations may allow users to adjust their behavior to prevent future declines by modifying one or more features of an operation.

Table 400 may include four fields such as field 403 (e.g., ID), field 406 (e.g., Subset of Features), field 409 (e.g., Modified Subset of Features), and field 412 (e.g., Outcome). Field 403 may provide a unique identifier, ensuring that each operation can be tracked through the malicious operation subsystem 166 and the modification recommendation subsystem 168. Operations 002 and 003, previously declined in table 300, are included in table 400 for further analysis, along with 005, which introduces an additional example of feature modification related to device authentication.

Field 406 may detail the subset of features, representing the specific features that had the most impact on the first prediction indicating that the operation was malicious. In some embodiments, the feature modification system 160 may select a subset of features for modification based on the feature impact parameters and corresponding measures of variability. The measures of variability may indicate the extent to which a feature can be feasibly modified. In some embodiments, the measure of variability may indicate the extent to which a feature can be modified at all. For example, a feature indicating an age of a user cannot be modified by the user to obtain a different result. In some embodiments, the measure of variability may be a score or scale (e.g., 0-1.0, 0-110%, etc.) indicating a feasibility or capability of varying each feature. The feature modification system 160 identifies features that, when adjusted, may result in a different prediction outcome. For example, in 002, the feature modification system 160 may identify and select the operation value (e.g., 5000) and location (e.g., Canada) as primary contributors to the malicious prediction and subsequent decline outcome. In 003, the value (e.g., 2000) and time of day (e.g., 2:00 AM) the operation took place were determined to be significant features that impacted the outcome. The feature modification system 160 may additionally determine the measure of variability for each feature and may select the subset of features based on both criteria.

In some embodiments, to select the subset of features, the feature modification system 160 may perform a first comparison between the feature impact parameters and an impact threshold to determine a first group of features that satisfies the impact threshold. Furthermore, feature modification system 160 may perform a second comparison between the measures of variability and a variability threshold to determine a second group of features that satisfies the variability threshold. The feature modification system 160 may select, based on the first comparison and the second comparison, the subset of features to indicate features belonging to both the first group of features and the second group of features. The feature modification system 160 may select features for the subset such that feature impact parameters and measures of variability are maximized for the features of the subset. The feature modification system 160 may select features for the subset, where the features have higher feature impact parameters than other features and remove, from the subset, any parameters having the lowest measure of variability. In some embodiments, the feature modification system 160 may use other methods of selecting the subset of features based on the feature impact parameters, the measures of variability, or other criteria.

Field 409 may represent the proposed feature modifications (e.g., modified parameters for approval), which are generated as part of the input dataset including entries. Each entry in the input dataset includes a different combination of values for the subset of features, where the modifications are derived from the corresponding proposed modifications. When creating these combinations, the feature modification system 160 may approach the modification differently depending on the type of features included in the subset of features. For example, the feature modification system 160 may modify continuous features differently from categorical features. For continuous features, such as the value of a computer operation, the feature modification system 160 may modify the feature by adjusting the numerical value by a certain amount or percentage. For instance, the system may increase the value by 10%, decrease it by 5%, or apply a more complex transformation like scaling it logarithmically. Additionally, the system may round the value to the nearest whole number or decimal place or apply a random perturbation within a specified range. These modifications can be fine-tuned to any degree of precision, allowing for a wide range of possible values. For example, the system may increase the value from 100 to 110, decrease it from 200 to 190, or apply a logarithmic transformation to change it from 1000 to approximately 3. In contrast, categorical features, such as the location of a computer operation, require changing the feature to a different category. For example, the feature modification system 160 may switch the location from a local server to a cloud-based server, or from a data center in one city to another. Unlike continuous features, categorical features have a fixed set of possible values, and modifications involve selecting a different category from this set. For instance, the system may change the location from New York to San Francisco, from an on-premises server to a remote server, or from a primary data center to a backup data center. Each change represents a distinct category shift. Additionally, the feature modification system 160 may modify the time of day, which can be treated as either a continuous or categorical feature depending on the granularity of the time intervals. If treated as continuous, the system may adjust the time by a specific number of hours or minutes, such as moving an operation from 2:00 PM to 3:30 PM or from 8:00 AM to 7:45 AM. If treated as categorical, the system may change the operation from one predefined time slot to another, such as from morning to afternoon, or from peak hours to off-peak hours.

The feature modification system 160 may proceed to create an input dataset including a number of entries. Each entry in the input dataset may include a different combination of values for the subset of features, where the modifications are derived from the corresponding proposed modifications. For example, the system may create multiple entries, each having different combinations of values for these features in the subset of features to be modified. To achieve this, the feature modification system 160 may generate a matrix of possible values for the selected features. For continuous features, the system may define a range of values and incrementally adjust the values within this range to create various combinations. For instance, if the first feature in the subset is the value of the operation, the system may generate values such as 5000, 5010, 5020, and so on. For another feature in the subset, which may be the time of day, the system may generate times such as 11:00 AM, 12:00 PM, 1:00 PM, etc. By combining these values, the system may create entries such as (5000, Canada, 11:00 AM), (5000, Canada, 12:00 PM), (5000, Canada, 1:00 PM), and so forth, and (5000, Canada, 10:35 AM), (5010, Canada, 11:00 AM), (5020, Canada, 11:00 AM), and so forth.

For categorical features, the system may select different categories to create combinations. For example, the location of the operation is a feature in the subset, the system may choose categories such as "USA" and "Spain." If the type of server is a feature of the subset, the system may select categories like "local server," "cloud-based server," and "remote server." By combining these categories, the system may create entries such as (5000, USA, 10:35 AM), (5000, Spain, 10:35 AM), and so on. The feature modification system 160 may systematically vary each feature of the subset of features to generate a comprehensive set of combinations. Each combination may represent a unique entry in the input dataset. This method ensures that the dataset includes a diverse range of scenarios, allowing the detection model to generate predictions for each of these scenarios.

In particular, the feature modification system 160 may input, into the detection model, the input dataset to obtain predictions corresponding to the entries. The detection model may evaluate the input dataset and generate a prediction for each entry. The feature modification system 160 may look for a given entry for which the detection model generates a second prediction, where the second prediction indicates that the operation is deemed "not malicious." For example, the detection model may generate a prediction for each scenario included in the input dataset. The feature modification system 160 may aim to identify adjustments (e.g., proposed modifications for the declined features) that result in a second prediction indicating that the operation is not malicious. Furthermore, the feature modification system 160 may aim to find a combination of features that changes the first prediction (e.g., malicious) to the second prediction (non-malicious) via the detection model. For example, in 002, the feature modification system 160 may reduce the operation value from 5000 to 3000 and modify the location from Canada to the USA via the modification recommendation subsystem 168. By adjusting these parameters, the detection model may generate a second prediction indicating that the operation is not malicious, allowing the operation to be approved.

In some embodiments, the feature modification system 160 may generate a recommendation indicating one or more modifications to one or more features of the subset features based on values of the given entry corresponding to the second prediction. Similarly, in 003, the feature modification system 160 may maintain the operation value at 2000 but modify the operation time from 2:00 AM to 8:00 AM, to align with the user's normal banking hours. Suggesting the adjustments to the users may result in an approval status for similar operations in the future, demonstrating how a user may modify their behavior to reduce the chances of their actions resulting in a malicious prediction. In some embodiments, the recommendation may be output in the form of a natural language recommendation. For example, the feature modification system 160 may use an LLM to generate a natural language recommendation, as previously discussed in relation to FIG. 2.

Field 412 may present the outcome transformation, including both the original prediction and the modified prediction. In all cases, the modified parameters lead to the operation being approved, confirming that the recommended feature adjustments are effective in reducing false-positive malicious predictions. In another embodiment, the modifications are based on a difference between initial values of the features and modified values of the features. The modified values correspond to the given entry for which the detection model generates the second prediction. Furthermore, the recommendation may further indicate an explanation that the modifications to the features are likely to result in the detection model outputting the second prediction for the operation. In some embodiments, the recommendation may be output in the form of a natural language explanation. For example, the feature modification system 160 may use an LLM to generate a natural language explanation, as previously discussed in relation to FIG. 2.

Operation 005 illustrates another example of how the feature modification system 160 generates recommendations by evaluating feature impact parameters and measures of variability. In this example, the feature modification system 160 may determine that the operation was flagged as malicious due to being initiated from a device not previously associated with the user's account. Since device recognition plays a critical role in identifying anomalous behavior, the feature modification system 160 may classify the operation as malicious and decline any operation being performed from the unrecognized device. To identify effective modifications, the feature modification system 160 may generate an input dataset comprising multiple entries, each representing a variation of device-related feature values. In one entry, the operation 005 is modified by initiating the operation with a previously recognized device, while another entry maintains the unrecognized device but incorporates an additional authentication factor. The feature modification system 160 may evaluate these variations and determine that the entry that included a previously recognized device resulted in a second prediction indicating that the operation was not malicious. Based on this result, the feature modification system 160 may generate a recommendation advising the user to either register the device before initiating similar operations or attempt the operation from a previously recognized device to prevent future declines. By dynamically analyzing device-related features and iteratively testing possible modifications, the feature modification system 160 provides actionable recommendations that help users align their operations with historically approved behaviors while maintaining security integrity.

As an illustrative example, the feature modification system 160 may detect and prevent fraudulent activity for a financial transaction in real time. The feature modification system continuously evaluates transaction data including multiple features, including transaction amount, login time, geographic location, device type, and past user behavior. For example, if a user initiates a high-value transaction from an unfamiliar location at an unusual time, the feature modification system assesses the transaction's risk level using a machine learning-based fraud detection model. If the detection model predicts that the transaction is likely fraudulent, the feature modification system declines the fraudulent transaction. In some embodiments, the feature modification system uses an LLM to generate a natural language output indicating one or more reasons for the first prediction (e.g., malicious operations). The explanation may highlight the most influential features that led to the decision. For example, the feature modification system may determine that the primary risk factors were an unrecognized device, a transaction amount exceeding the user's historical spending pattern, and an unexpected login location. Based on this analysis, the feature modification system generates a detailed breakdown of why the transaction was flagged and provides insights into how the user can prevent similar declines in the future.

To improve user experience and minimize false positives, the feature modification system may also output recommendations to users to prevent similar declines in the future by adjusting significant fraud detection features. In cases where a transaction is declined, the feature modification system evaluates how modifications to influential factors could have resulted in approval. For example, if the feature modification system determines that a transaction was flagged due to an unrecognized device, an unusually high transaction amount, or an unexpected login location, the feature modification system assesses how altering these features might have changed the outcome. If the user had initiated the transaction from a previously recognized device, conducted the purchase within their established spending range, or logged in from a familiar location, the detection model may have deemed the transaction legitimate and allowed the transaction to proceed.

The feature modification system 160 may additionally analyze patterns in transactions that were previously declined and subsequently approved to determine effective modifications to features. By examining the values of features in these transactions, the system may identify specific modifications that led to the approval of initially declined transactions. For example, the feature modification system 160 may observe that increasing the transaction amount by a certain percentage or changing the transaction time to occur during business hours resulted in approval. Similarly, the feature modification system 160 may identify that switching the transaction location from a high-risk area to a low-risk area or changing the type of server used for processing led to successful approvals. By leveraging these insights, the feature modification system 160 may recommend similar modifications to new transactions, enhancing the likelihood of approval. For example, the feature modification system 160 may include these modifications in the input dataset that is used to test various combinations of features using the detection model. The feature modification system 160 may include similar modifications to those that resulted in approvals in past transactions. Because these modifications have a demonstrated history of resulting in approvals, they may be more likely to result in improved outcomes for new transactions. This analysis-driven approach allows the system to continuously learn from past transactions and optimize feature modifications to improve transaction outcomes.

The potential modifications determined by the feature modification system are presented to the user in real time, providing actionable insights that help users prevent unnecessary transaction declines. In instances where the transaction remains high-risk despite adjustments, the feature modification system may recommend additional security measures, such as identity verification or pre-authorization for large purchases. Through this adaptive fraud detection approach, the feature modification system continuously refines the risk assessment process of the feature modification system, thereby reducing unnecessary declines, improving fraud detection accuracy, and enhancing overall banking security.

Figure 5:
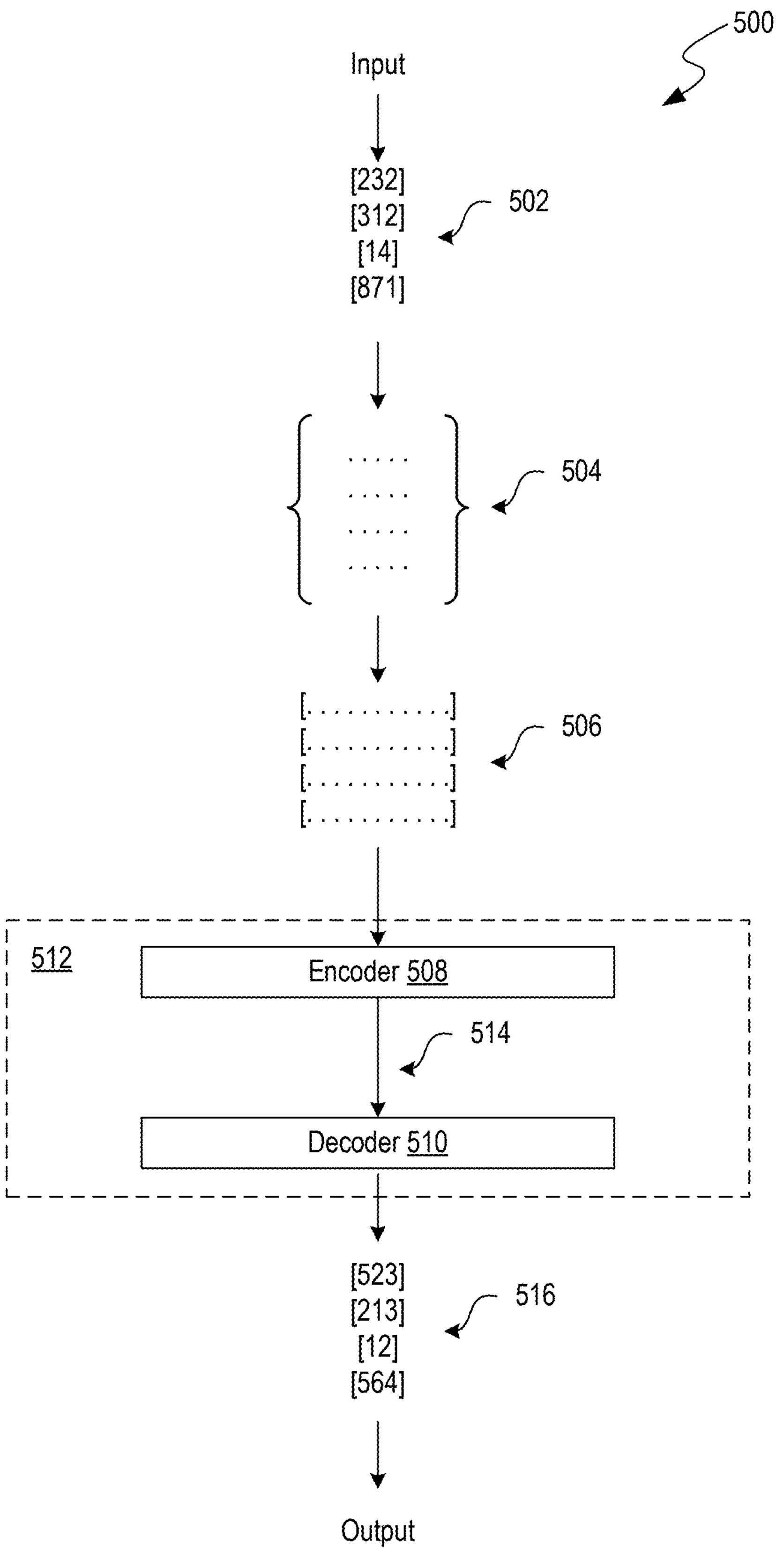
FIG. 5 is a block diagram of an example transformer used to recommend feature modifications to change malicious activity predictions, in accordance with one or more embodiments of this disclosure.

FIG. 5 is a block diagram 500 of an example transformer 512 used to recommend feature modifications to change malicious activity predictions, in accordance with one or more embodiments of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any machine learning-based language model, including language models based on other neural network architectures such as RNN-based language models.

The transformer 512 includes an encoder 508 (which can include one or more encoder layers/blocks connected in series) and a decoder 510 (which can include one or more decoder layers/blocks connected in series). Generally, the encoder 508 and the decoder 510 each include multiple neural network layers, at least one of which can be a self-attention layer. The parameters of the neural network layers can be referred to as the parameters of the language model.

The transformer 512 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 512 is trained to perform certain functions on other input formats than natural language input. For example, the input can include objects, images, audio content, or video content, or a combination thereof.

As described herein, such a model may be used in order to generate commands, e.g., such as those to effectuate operations for monitoring and testing at tool-based monitoring systems, as well as for potentially transmitting data from those operations to the system.

The transformer 512 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 5 illustrates an example block diagram 500 of how the transformer 512 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the example 500, a short sequence of tokens 502 corresponding to the input text is illustrated as input to the transformer 512. Tokenization of the text sequence into the tokens 502 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 512 can be of any length up to a maximum length defined based on the dimensions of the transformer 512. Each token 502 in the token sequence is converted into an embedding 506 (also referred to as "embedding vector").

An embedding 506 is a learned numerical representation (such as, for example, a vector) of a token that captures some semantic meaning of the text segment represented by the token 502. The embedding 506 represents the text segment corresponding to the token 502 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 506 corresponding to the "write" token will be closer to another embedding corresponding to the "jot down" token in the vector space as compared to the distance between the embedding 506 corresponding to the "write" token and another embedding corresponding to the "summary" token.

The vector space can be defined by the dimensions and values of the embedding vectors. Various techniques can be used to convert a token 502 to an embedding 506. For example, another trained machine learning model can be used to convert the token 502 into an embedding 506. In particular, another trained machine learning model can be used to convert the token 502 into an embedding 506 in a way that encodes additional information into the embedding 506 (e.g., a trained machine learning model can encode positional information about the position of the token 502 in the text sequence into the embedding 506). In some implementations, the numerical value of the token 502 can be used to look up the corresponding embedding in an embedding matrix 504, which can be learned during training of the transformer 512.

The generated embeddings, e.g., such as the embedding 506, are input into the encoder 508. The encoder 508 serves to encode the embedding 506 into feature vectors 514 that represent the latent features of the embedding 506. The encoder 508 can encode positional information (i.e., information about the sequence of the input) in the feature vectors 514. The feature vectors 514 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 514, that can be generated by the encoder 508 can be referred to as a latent space or feature space.

Conceptually, the decoder 510 is designed to map the features represented by the feature vectors 514 into meaningful output, which can depend on the task that was assigned to the transformer 512. For example, if the transformer 512 is used for a translation task, the decoder 510 can map the feature vectors 514 into text output in a target language different from the language of the original tokens 502. Generally, in a generative language model, the decoder 510 serves to decode the feature vectors 514 into a sequence of tokens. The decoder 510 can generate output tokens 516 one by one. Each output token 516 can be fed back as input to the decoder 510 in order to generate the next output token 516. By feeding back the generated output and applying self-attention, the decoder 510 can generate a sequence of output tokens 516 that has sequential meaning (e.g., the resulting output text sequence is understandable as a sentence and obeys grammatical rules). The decoder 510 can generate output tokens 516 until a special [EOT] token (indicating the end of the text) is generated. The resulting sequence of output tokens 516 can then be converted to a text sequence in post-processing. For example, each output token 516 can be an integer number that corresponds to a vocabulary index. By looking up the text segment using the vocabulary index, the text segment corresponding to each output token 516 can be retrieved, the text segments can be concatenated together, and the final output text sequence can be obtained.

In some implementations, the input provided to the transformer 512 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

Figure 6:
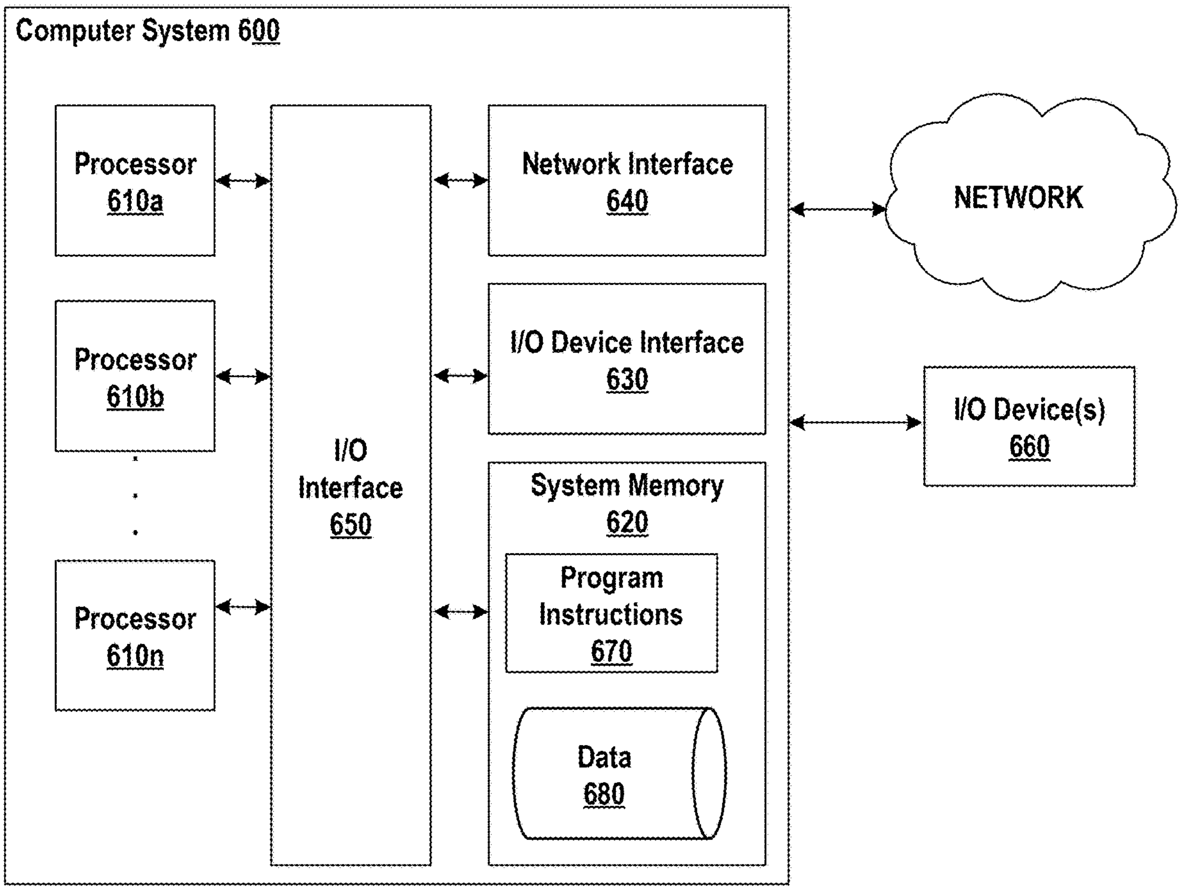
FIG. 6 illustrates an example computing system that may be used in accordance with some embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multiprocessor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

The I/O device interface 630 and I/O devices 660 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, or the like. Alternatively or additionally, the user may use their voice to indicate specific nodes, specific models, or the like via the voice recognition device or microphones.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a LAN, a WAN, a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device or a plurality of memory devices (e.g., distributed memory devices).

I/O interface 650 may be configured to coordinate I/O traffic between processors 610*a*-610*n*, system memory 620, network interface 640, I/O devices 660, or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 7:
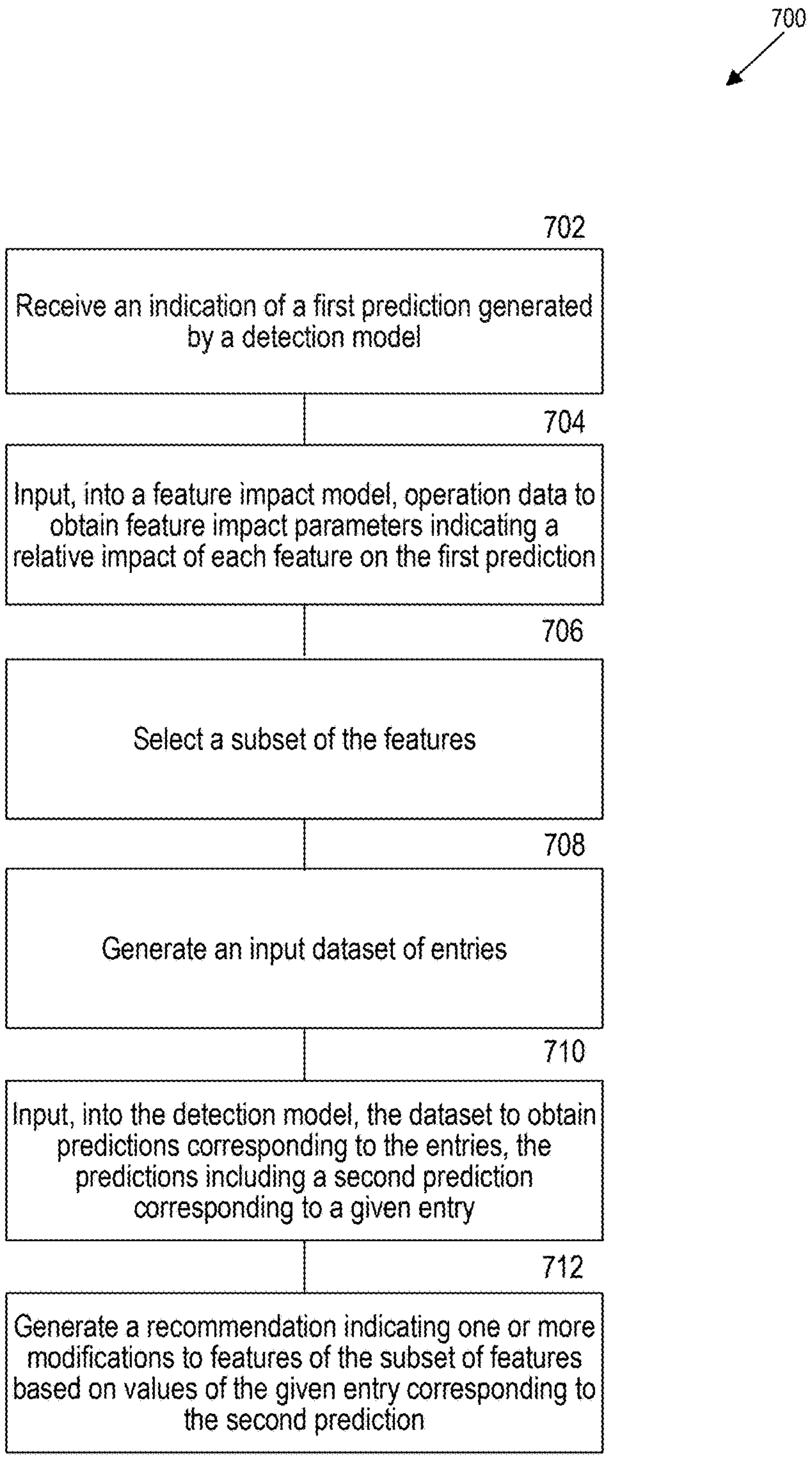
FIG. 7 is a flowchart of operations for recommending feature modifications to change malicious activity predictions generated by machine learning models, in accordance with one or more embodiments of this disclosure.

FIG. 7 is a flowchart 700 of operations for recommending feature modifications to change malicious activity predictions generated by machine learning models, in accordance with one or more embodiments of this disclosure. The operations of FIG. 7 may use components described in relation to FIG. 6. In some embodiments, the feature modification system 160 may include one or more components of computer system 600.

At operation 702, the feature modification system 160 (e.g., using one or more of processors 610*a*-610*n*) may receive an indication of a first prediction generated by a detection model, where the first prediction indicates that an operation is malicious and results in the operation being blocked. The operation data may include metrics such as amounts, geographic locations, and access time information. As described herein, the operation data may be obtained as a result of commands generated and transmitted via one or more of processors 610*a*-610*n*. One or more of processors 610*a*-610*n* may receive the data over the communication network 140 using network interface 640.

At operation 704, the feature modification system 160 (e.g., using one or more of processors 610*a*-610*n*) may input, into a feature impact model, operation data to obtain feature impact parameters indicating a relative impact of each feature on the first prediction as generated by the detection model. The operation data may indicate values associated with the features. According to some examples, as described herein, the feature impact model may be trained to output relative impacts of features on predictions generated by models.

At operation 706, the feature modification system 160 (e.g., using one or more of processors 610*a*-610*n*) may select, based on the feature impact parameters and measures of variability, a subset of features. Each measure of variability indicates an extent to which a corresponding feature can be modified. In some examples, the feature modification system may determine that the time at which an operation is performed is a modifiable feature with a high measure of variability. If an operation is predicted to be flagged as anomalous due to an unusual execution time, the feature modification system may suggest adjusting the timing of the operation to align with typical usage patterns, thereby reducing the likelihood of unnecessary restrictions or interruptions.

At operation 708, the feature modification system 160 (e.g., using one or more of processors 610*a*-610*n*) may generate an input dataset of entries. Each entry may include a different combination of values for the features based on the corresponding proposed modifications to each feature of the subset of features. For example, if the feature modification system is analyzing operations for potential security risks, the input dataset may include entries with different combinations of feature values, such as adjusted access times, request types, or execution environments. By evaluating these different combinations, the feature modification system may determine which modifications result in the operation being classified as non-malicious.

At operation 710, the feature modification system 160 (e.g., using one or more of processors 610*a*-610*n*) may input, into the detection model, the input dataset to obtain the predictions corresponding to the entries, with the predictions including a second prediction corresponding to a given entry. The second prediction indicates that the operation is not malicious. For example, this may indicate that the particular combination of feature values included in the given entry is likely to result in the operation being deemed "not malicious."

At operation 712, the feature modification system 160 (e.g., using one or more of processors 610*a*-610*n*) may generate a recommendation indicating one or more modifications to features of the subset of features based on values of the given entry corresponding to the second prediction. This recommendation may include adjustments to operational parameters (e.g., features) that, when modified, result in an operation being classified as non-malicious. For example, the feature modification system 160 may determine that adjusting the access time or request type of an operation aligns it with previously approved behaviors. Based on this, the feature modification system 160 may present a recommendation, suggesting modifications that would increase the likelihood of future operations being approved while maintaining security integrity.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology not only may include additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

What is claimed is:

1. A system for recommending feature modifications to change predictions generated by machine learning models, the system comprising:

a storage device; and one or more processors communicatively coupled to the storage device storing instructions thereon, that cause the one or more processors to:

receive an indication of a first prediction generated by a detection model, wherein the first prediction indicates that an operation is malicious and results in the operation being blocked;

input, into a feature impact model, operation data to obtain a plurality of feature impact parameters indicating a relative impact of each feature of a plurality of features on the first prediction as generated by the detection model, wherein the feature impact model is trained to output relative impacts of features on predictions generated by models, and wherein the operation data comprises a plurality of values associated with the plurality of features;

select, based on the plurality of feature impact parameters and a plurality of measures of variability, a subset of the plurality of features, wherein each measure of variability indicates an extent to which a corresponding feature can be modified;

generate an input dataset comprising a plurality of entries, wherein each entry comprises a different combination of values for the plurality of features based on a corresponding plurality of proposed modifications to each feature of the subset of the plurality of features;

input, into the detection model, the input dataset to obtain a plurality of predictions corresponding to the plurality of entries, the plurality of predictions comprising a second prediction corresponding to a given entry, wherein the second prediction indicates that the operation is not malicious; and generate a recommendation indicating one or more modifications to one or more features of the subset of the plurality of features based on values of the given entry corresponding to the second prediction, wherein the one or more modifications are based on a difference between initial values of the one or more features and modified values of the one or more features, and wherein the modified values correspond to the given entry for which the detection model generates the second prediction.

2. The system of claim 1, wherein, to select the subset of the plurality of features, the instructions further cause the one or more processors to:

perform (i) a first comparison between a plurality of feature impact parameters and an impact threshold to determine a first group of features of the plurality of features that satisfies the impact threshold and (ii) a second comparison between the plurality of measures of variability and a variability threshold to determine a second group of features of the plurality of features that satisfies the variability threshold; and select, based on the first comparison and the second comparison, the subset of the plurality of features to comprise features belonging to both the first group of features and the second group of features.

3. The system of claim 1, wherein, to select the subset of the plurality of features, the instructions further cause the one or more processors to select features for the subset such that feature impact parameters and measures of variability are maximized for the features of the subset.

4. The system of claim 1, wherein, to select the subset of the plurality of features, the instructions further cause the one or more processors to:

select one or more features for the subset, the one or more features having higher feature impact parameters than other features of the plurality of features; and remove, from the subset, any parameters having a lowest measure of variability.

5. The system of claim 1, wherein the recommendation further comprises an explanation that the one or more modifications to the one or more features is likely to result in the detection model outputting the second prediction for the operation.

6. A method comprising:

receiving an indication of a first prediction generated by a detection model, wherein the first prediction indicates that an operation is malicious;

inputting, into a feature impact model, operation data to obtain a plurality of feature impact parameters indicating a relative impact of each feature of a plurality of features on the first prediction as generated by the detection model;

selecting, based on the plurality of feature impact parameters, a subset of the plurality of features;

generating an input dataset comprising a plurality of entries, wherein each entry comprises a different combination of values for the plurality of features based on a corresponding plurality of proposed modifications to each feature of the subset of the plurality of features;

inputting, into the detection model, the input dataset to obtain a plurality of predictions corresponding to the plurality of entries, the plurality of predictions comprising a second prediction corresponding to a given entry, wherein the second prediction indicates that the operation is not malicious; and determining one or more modifications to one or more features of the subset of the plurality of features based on values of the given entry corresponding to the second prediction, wherein the one or more modifications are based on a difference between initial values of the one or more features and modified values of the one or more features, and wherein the modified values correspond to the given entry for which the detection model generates the second prediction.

7. The method of claim 6, wherein selecting the subset of the plurality of features comprises selecting the subset of the plurality of features further based on a plurality of measures of variability, wherein each measure of variability indicates an extent to which a corresponding feature can be modified.

8. The method of claim 7, wherein selecting the subset of the plurality of features further comprises:

performing (i) a first comparison between plurality of feature impact parameters and an impact threshold to determine a first group of features of the plurality of features that satisfies the impact threshold and (ii) a second comparison between the plurality of measures of variability and a variability threshold to determine a second group of features of the plurality of features that satisfies the variability threshold; and selecting, based on the first comparison and the second comparison, the subset of the plurality of features to comprise features belonging to both the first group of features and the second group of features.

9. The method of claim 7, wherein selecting the subset of the plurality of features further comprises selecting features for the subset such that feature impact parameters and measures of variability are maximized for the features of the subset.

10. The method of claim 7, wherein selecting the subset of the plurality of features further comprises:

selecting one or more features for the subset, the one or more features having higher feature impact parameters than other features of the plurality of features; and removing, from the subset, any parameters having a lowest measure of variability.

11. The method of claim 6, further comprising generating a recommendation comprising the one or more modifications to the one or more features of the subset of the plurality of features based on the values of the given entry corresponding to the second prediction.

12. One or more non-transitory, computer-readable media comprising instructions recorded thereon that, when executed by one or more processors, cause operations for monitoring application programming interfaces at a network system, comprising:

receiving an indication of a first prediction generated by a detection model, wherein the first prediction indicates that an operation is malicious;

inputting, into a feature impact model, operation data to obtain a plurality of feature impact parameters indicating a relative impact of each feature of a plurality of features on the first prediction as generated by the detection model;

selecting, based on the plurality of feature impact parameters, a subset of the plurality of features;

generating an input dataset comprising a plurality of entries, wherein each entry comprises a different combination of values for the plurality of features based on a corresponding plurality of proposed modifications to each feature of the subset of the plurality of features;

inputting, into the detection model, the input dataset to obtain a plurality of predictions corresponding to the plurality of entries, the plurality of predictions comprising a second prediction corresponding to a given entry, wherein the second prediction indicates that the operation is not malicious; and determining one or more modifications to one or more features of the subset of the plurality of features based on values of the given entry corresponding to the second prediction, wherein the one or more modifications are based on a difference between initial values of the one or more features and modified values of the one or more features, and wherein the modified values correspond to the given entry for which the detection model generates the second prediction.

13. The one or more non-transitory, computer-readable media of claim 12, wherein the instructions for selecting the subset of the plurality of features further cause the one or more processors to perform operations comprising selecting the subset of the plurality of features further based on a plurality of measures of variability, wherein each measure of variability indicates an extent to which a corresponding feature can be modified.

14. The one or more non-transitory, computer-readable media of claim 13, wherein the instructions for selecting the subset of the plurality of features further cause the one or more processors to perform operations comprising:

performing (i) a first comparison between a plurality of feature impact parameters and an impact threshold to determine a first group of features of the plurality of features that satisfies the impact threshold and (ii) a second comparison between the plurality of measures of variability and a variability threshold to determine a second group of features of the plurality of features that satisfies the variability threshold; and selecting, based on the first comparison and the second comparison, the subset of the plurality of features to comprise features belonging to both the first group of features and the second group of features.

15. The one or more non-transitory, computer-readable media of claim 13, wherein the instructions for selecting the subset of the plurality of features further cause the one or more processors to perform operations comprising selecting features for the subset such that feature impact parameters and measures of variability are maximized for the features of the subset.

16. The one or more non-transitory, computer-readable media of claim 13, wherein the instructions for selecting the subset of the plurality of features further cause the one or more processors to perform operations comprising:

selecting one or more features for the subset, the one or more features having higher feature impact parameters than other features of the plurality of features; and removing, from the subset, any parameters having a lowest measure of variability.

17. The one or more non-transitory, computer-readable media of claim 12, further comprising generating a recommendation comprising the one or more modifications to the one or more features of the subset of the plurality of features based on the values of the given entry corresponding to the second prediction.

* * * * *